United States Patent [19]

Beetstra

[11] Patent Number: 4,497,050
[45] Date of Patent: Jan. 29, 1985

[54] METHOD AND DEVICE FOR WRITING A DATA BLOCK INTO A RECORD CARRIER BODY

[75] Inventor: Tsjalling Beetstra, Apeldoorn, Netherlands

[73] Assignee: U.S. Philips Corporation, New York, N.Y.

[21] Appl. No.: 543,794

[22] Filed: Oct. 21, 1983

Related U.S. Application Data

[63] Continuation of Ser. No. 289,665, Aug. 3, 1981.

[51] Int. Cl.³ .............................................. G11B 7/00
[52] U.S. Cl. ........................................ 369/59; 369/48; 369/111
[58] Field of Search ................ 369/30, 32, 47, 48, 369/59, 56, 100, 111, 124, 275; 358/342, 336, 335; 360/38.1, 77, 78; 371/2, 10, 40; 365/127, 121, 122, 126, 200; 340/762

[56] References Cited

U.S. PATENT DOCUMENTS

| | | | |
|---|---|---|---|
| 3,919,697 | 11/1975 | Walker | 369/77 |
| 4,094,013 | 6/1978 | Hill et al. | 369/111 |
| 4,145,758 | 3/1979 | Drexler et al. | 365/200 |
| 4,308,557 | 12/1981 | Dieterich | 369/47 X |
| 4,308,612 | 12/1981 | Miyauchi et al. | 369/48 |
| 4,309,721 | 1/1982 | Christopher | 371/38 X |
| 4,310,916 | 1/1982 | Dil | 369/275 |
| 4,363,116 | 12/1982 | Kleuters et al. | 369/30 |

FOREIGN PATENT DOCUMENTS

| | | | |
|---|---|---|---|
| 2012460 | 7/1979 | United Kingdom | 371/40 |
| 2036410 | 6/1980 | United Kingdom | 369/275 |

OTHER PUBLICATIONS

Bliss, W. G. et al., "Error Correction Code", IBM Tech. Disc. Bull., vol. 23, No. 10, Mar. 1981, pp. 4629–4632.

*Primary Examiner*—Donald McElheny, Jr.
*Attorney, Agent, or Firm*—Jack E. Haken; James J. Cannon, Jr.

[57] ABSTRACT

A method and an associated device for the writing of information into a record carrier body. The record carrier body is preferably made of a radiation-sensitive medium. The information is written in at least one sector of the record carrier body. During the first write operation, a part of the sector remains non-inscribed. The information is written in an interleaved manner on the record carrier body, the informtion is also written on the record carrier body in said non-inscribed part during a second write operation. The use of so-called "interleaving" protects the information written in the sector against an error burst.

2 Claims, 5 Drawing Figures

| | | | | | | | | | |
|---|---|---|---|---|---|---|---|---|---|
| 1 | 43 | 85 | 127 | 169 | | 505 | 547 | 589 | 631 |
| 2 | 44 | 86 | 128 | | | 506 | 548 | 590 | 632 |
| 3 | 45 | 87 | | | | | | | 633 |
| 4 | 46 | | | | | | | | |
| | | | | A | | | | C | |
| 32 | 74 | 116 | | | 494 | 536 | | | |
| 33 | 75 | | | | 495 | 537 | | | |
| 34 | | | | | 496 | 538 | | | |
| | | | | | | B | | | |
| 39 | 81 | 123 | | | 501 | 543 | | | 669 |
| 40 | 82 | 124 | K | | 502 | 544 | | 628 | 670 |
| 41 | 83 | 125 | D | | 503 | 545 | 587 | 629 | 671 |
| 42 | 84 | 126 | E | | 504 | 546 | 588 | 630 | 672 |

F  G

METHOD AND DEVICE FOR WRITING A DATA BLOCK INTO A RECORD CARRIER BODY

This is a continuation of application Ser. No. 289,665, filed Aug. 3, 1981.

BACKGROUND OF THE INVENTION

The present invention relates to a method of writing information in a bit serial sequence on a record carrier body. Said record carrier body comprises a plurality of successive sectors, said information being arranged in a data block, said sector having the capacity for the storage of at least one data block, said data block comprising a first and a second number of data segments, said second number of data segments being substantially smaller than said first number of data segments, said method comprising the steps of:

1. loading into a memory in a first sequence of first data segments the information to be written into said first number of data segments;
2. adding an equal number of correction bits to the information stored in each of said first data segments of said first number of data segments;
3. a first phase of writing in a sector of said record carrier body, said first phase comprising the following substeps:
   a. dividing each of said first data segments into an equal number of data subsegments;
   b. fetching from each first data segment a first data subsegment and writing in a bit serial sequence into said first number of data segments the content of each of said fetched first data subsegment into said record carrier body;
   c. repeating said fetching and writing of substep b for each further data subsegment of each first data segment until all data subsegments are written into said sector.

Often the information written on the record carrier body cannot be erased.

This is for example the case when an optical disc is used as record carrier body. In this case writing the information is done by burning a hole onto the disc. This can cause some problems when the information has become obsolete due to given circumstances, and so has to be updated. The updating of the information may concern, for example, the changing of the status a data unit from valid to invalid or from actual to obsolete, the changing of the content of a data unit, and the supplementing of the content of a data unit. Because writing is usually irreversible, local updating of the informaton at a later stage is not possible.

A known solution therefore is to leave non-inscribed an area of the sector to be written, in this case the second number of data segments.

In said area updating information can then be introduced during a further write operation. Such updating information may be, for example, the address of a further sector where the updated information is stored.

A drawback of this solution is that when an error and specially a burst error occurs in the updated information, this cannot be corrected, thus leaving the updated information unusable.

SUMMARY OF THE INVENTION

The method in accordance with the invention gives a solution for correcting said updated information, by writing the information and the updated information in "interleaved" manner. This interleaving of the information written into the first number of data segments is realized as described in the step 3 of the method described above.

In order to provide a correction possibility of the updated information, a method according to the present invention comprises a later phase of writing in the same sector where said information was written during said first phase, said later phase being separated in time from the first phase by an amount of time which is larger than the time required to write into a sector of said record carrier body, said later phase comprising the following substeps:

a. loading into a memory in said first sequence of first data segments further information to be written into said second number of data segments;
b. adding an equal number of correction bits to the further information stored in each of said first data segments and said second number of data segments;
c. dividing each of said first data segments of said second number of data segments into an equal number of data subsegments;
d. fetching from each first data segment a first data subsegment and writing in a bit serial sequence into said second number of data segments the content of each of said fetched first data subsegments into said record carrier body;
e. repeating said fetching and writing of substep d for each further data subsegment of each first data segment until all data subsegments are written into said sector.

The further information is written interleaved into the second number of data segments of the data block, which second number of data segments remained non-inscribed during said first phase of writing. The fact that correction bits are added to said further information offers the possibility for correcting errors in this further information. Because the further information is also written interleaved into the second number of data segments, the effect of an error burst in the first data segments of the second number of data segments is distributed over the whole sector, so that such an error burst is reduced to an error. An error at the level of a short data subsegment can be corrected by means of the added error correction bits.

The present invention relates also to a device for writing information according to the method of the invention, said device comprising a memory for loading and temporarily storing in said first sequence of first data segments the information to be written into said sector, a write means having an input connected to an output of said memory for receiving said information, said write means being provided for executing said writing in a bit serial sequence into said record carrier body.

Because the exact meaning of the terms "sector" and "data block" is not unambiguously defined in literature, the meaning of these terms as used herein is defined below.

Sector: the record carrier body comprises at least one track. A track comprises at least one sector. A sector contains space for the writing of information. This space is divided into a synchronization area (HD) and a data field (DTV). Each sector contains a number of bytes. The number of bytes per sector is not necessarily the same for each sector. The synchronization area (HD) contains organization information, for example, the track number, the sector address and synchronization signals. This organization information is customarily provided during the manufacture of the record carrier body. In the data field (DTV) there is space for information, for example, data information which can be provided by the user.

Data block: a data block contains a number of bytes. The user can write a data block in each sector. A data block contains, for example, the data information to be written, together with the associated error correction bits. When the organization information has already been provided in the synchronization area of a sector during the manufacture of the record carrier body, a data block represents the content written into the data field of the sector.

BRIEF DESCRIPTION OF THE DRAWINGS

The invention will be described in detail hereinafter with reference to the accompanying diagrammatic drawings.

PREFERRED EMBODIMENT

In the preferred embodiment a radiation-sensitive medium, referred to as an optical disc, is used as the record carrier body. Such a type of optical disc is described in U.S. Pat. No. 4,363,116. The optical disc comprises a servo track, one revolution being referred to as a track and each track being subdivided into a number of sectors.

Figure 1:
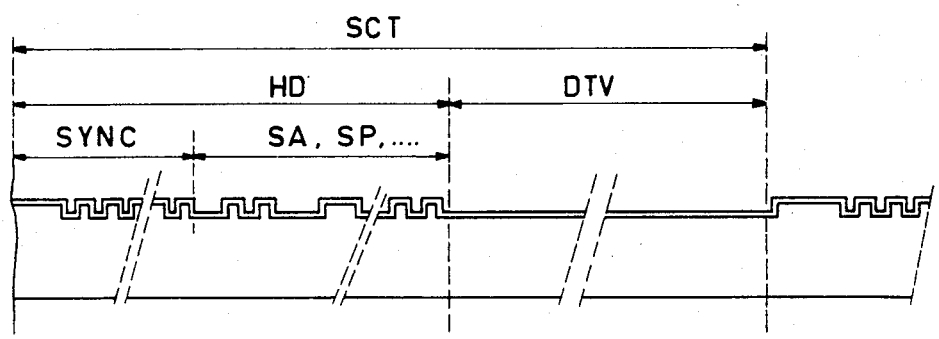
FIG. 1 shows an example of the lay-out of sector of a track.
Figure 3:
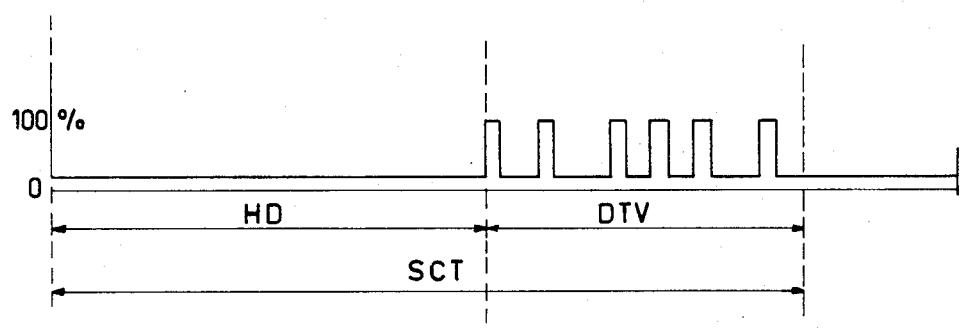
FIG. 3 shows an example of the intensity variation of the WRS beam in a sector.

FIG. 1 is analogous to FIG. 3 of U.S. Pat. No. 4,363,116 and shows an example of the lay-out of a sector (SCT) of a track. Such a sector is subdivided into a synchronization area (HD) and a data field (DTV). The synchronization area (HD) is intended for organization information inscribed during the manufacturing of the optical disc. The organization information contains inter alia the track number (SP), the sector address (SA) and also word and bit synchronization (Sync). The data field (DTV) is intended for the writing of the data block. A laser is used as a write means for writing data blocks in the optical disc.

Figure 2:
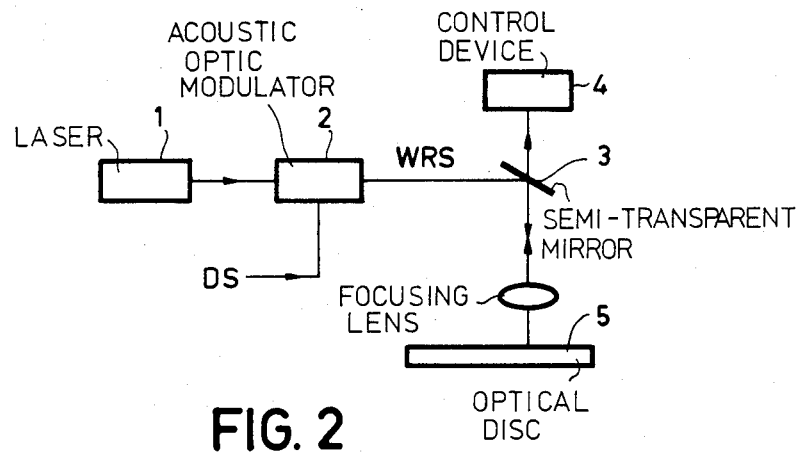
FIG. 2 shows a device for writing data information and for reading organization information from an optical disc.

FIG. 2 shows a device for writing data in the optical disc and for reading the organization information from such an optical disc. The beam of a laser (1) is incident on an acousto-optic modulator (2) which is controlled by the data signal (DS). The modulated laser beam (WRS beam) passes via a semi-transparent mirror (3) to the optical disc (5). The reflected beam (WRS beam) is directed to a control device (4) via the semi-transparent mirror.

FIG. 3 shows an example of the intensity variation of the WRS beam in a sector. The intensity is low when the beam is in the synchronization area (HD) of the sector. Because no data is written in the synchronization area, the beam serves as a read beam for the organization information which it transfers to the control device (4). The intensity of the WRS beam in the data field is determined by the modulated data signal.

The data blocks are written in the optical disc by the WRS beam and usually are read directly thereafter. This requires a read means which reads the data written directly after the writing. For this read means use in made of a second laser beam (DRS). This beam can be formed by using a second laser as described in U.S. Pat. No. 4,225,873, or by optical splitting of the laser beam used for the WRS beam.

The information received from a data source is written in the form of data blocks in the sectors of the optical disc.

Figures 4, 5:
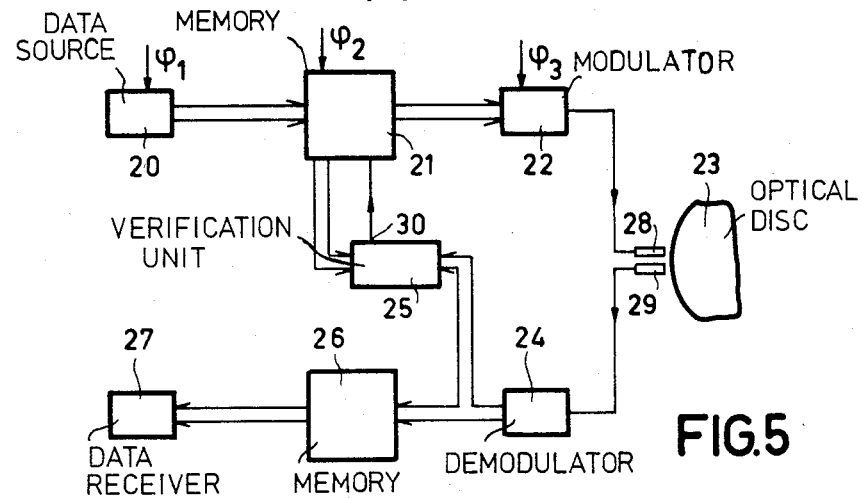
FIG. 4 shows an example of a format of a data field of an optical disc.
FIG. 5 shows a device for writing and reading information onto and from record carrier body.

FIG. 4 shows an example of how such a data block is composed. Each of the numerals 1 to 672 in the Figure represents a tetrade or group of four bits (i.e. one half of an eight-bit byte). The section A contains information supplied by a user, the supply sequence being: one line after the other, i.e. from left to right; the tetrades in the section B do no count in this respect: 1, 43, 85, . . . , 505, 2, 44, . . . , 3, 45, . . . , 4, . . . , 494, 536, 33, . . . , 495, 34, . . . , 496, 39, . . . , 501. This data block thus contains 512 tetrades (256 bytes). For the storage on the record carrier body, 672 tetrade positions are available as described; the content thereof will be described hereinafter. The 672 tetrade positions are present on the record carrier body in the numerical sequence: 1, 2, 3, . . . , 40, 41, 42, 43, . . . 672 (interleaved). The further sections are used as follows:

(1) the section B containing the tetrades 537 . . . 544 (4 bytes) is available for characterizing the information of the relevant sector. This characterization can indicate that the relevant sector is the first one of a group of sectors which together form a member of a file. In many cases such a first sector will contain a title of the relevant member. The characterization may also indicate that the relevant sector is the first one or the last one of a given user file, which thus contains information of a similar kind or is accessible only for a given category of users.

(2) the section D at the bottom left which contains the tetrades 41, 83, 125, . . . , 503, 545 (13 tetrades) forms the so-called data area II. This area is available for the storage of the following information:

(a) information whether the relevant sector contains reliable or unreliable information; the content of a sector can thus be logically erased; physically this information is still present, but if the further information "unreliable" is detected in this data area II, the relevant sector content may be ignored.

(b) further information for indicating the status of the sector content; the content may be: updated; obsolete, but not incorrect; supplemented by further information; modified by further information. This information may be stored elsewhere, in which case space is available in this section for indicating the address of this further information. It is also possible to provide a data block with several areas such as the data area II, which may then be consecutively numbered. The section K then forms, for example, the data area III. This data area III is then analogous to the data area II as regards structure as well as function.

This section D (and/or K) remains non-inscribed when data is originally recorded into virginal optical disc. Said further information can thus be inscribed in a later phase into this section D (and/or K). This is necessary in order to make it possible to update the information originally recorded in this sector. Two phases are thus to be distinguished in a method of writing information into a record carrier body according to the present invention. A first phase of writing a data block in a sector of a virginal optical disc whereby a part of said sector namely the section D (and/or K) remains non-inscribed, and a later phase of writing further information into said section D (and/or K). This later phase can be located in time even several years after said first phase.

(3) the section E at the bottom left which contains the tetrades 42, 84, ..., 546 (13 tetrades) is intended for example for a sequence identifier. The information thus to be provided (sections A, B, D, E) contains 42 lines of 13 tetrades (52 bits) each.

(4) for each line the sections C, F, G contain three tetrades (12 bits) of error correction bits. These three tetrades enable correction of one arbitrarily disturbed tetrade per line (64 bits).

Section C, respectively F, G contains the correction bits for section A, respectively D, E. The fact that there is a section F for the correction bits of section D implies that correction is also possible on the further information inscribed during said later phase in section D.

Using a suitable corrector matrix, the following error indication can be found when such a line is read:
(a) correct/incorrect information (1 bit),
(b) an error locator which indicates in which position the error is present,
(c) an error value which is a value which has to be added modulo-2 to the disturbed tetrade in order to reconstruct the nondisturbed tetrade.

Such an error correction system is known per se. By interleaving in accordance with FIG. 4, one series of 42 consecutive, arbitrarily disturbed tetrades can thus be corrected per data block. Interleaving is for example described in the U.S. Pat. No. 4,363,116 (Column 13, lines 4–20).

FIG. 5 shows a device for writing information in a record carrier body, and for reading this information. The clock signals $\phi_1, \phi_2, \phi_3$ originate from a clock (not shown). The information to be written originates from a data source (20). Under the control of a first clock signal $\phi_1$, information is fetched, for example, 8 bits in parallel, from the data source and is stored in a memory (21) under the control of a second clock signal $\phi_2$. Under the control of the second clock signal $\phi_2$, a sufficient amount of information is fetched and stored in the manner described herebefore in the memory (21) for the filling of one sector with one data block. The error correction bits, generated by a known error correction bit generator, are added to the information stored in the memory. Under the control of a third clock signal $\phi_3$, the data block is transferred, via a modulator (22) which converts the parallel information stream into a serial stream, to the write laser (28) which writes in an "interleaved manner" the data block in a sector of the optical disc. Usually during the write-operation, the data block is maintained in the memory (21). During the writing then, a read laser (29) reads the data block directly after it has been written on the optical disc. Directly is to be understood to mean herein that the period of time expiring between the writing of the information and the reading of the same information is smaller than the period of time required by the read laser for reading the synchronization area of a sector. The bit-wise read signal is applied, via a demodulator (24) which converts the serial bit stream into a parallel stream, to a verification unit (25). Because the data block is read directly after the writing, the recently written data block can be compared during the write phase with the original data block stored in the memory (21). This comparison is performed in a verification unit (25). The result of this comparison, the verification result, appears on an output terminal (30) of the verification unit (25). If the data block read by the read laser corresponds to the original data block stored in the memory (21), it is considered to be a correctly written data block. If the data block has been correctly written, a next data block may be stored in the memory. This next data block is then written in the described manner in the next sector. If the data block has not been correctly written, the data block is written again in another sector before a next data block is stored in the memory (21).

When the information is retrieved from the sectors inscribed on the optical disc, the signal from the read laser (29) is applied to a memory (26) via said demodulator (24). The readed data block is applied to a data receiver (27).

A writing operation during said late phase is analog to a writing operation described hereabove, the only difference is that now only data is inscribed in section D (and/or K) and there corresponding section containing their correction bits (section F for section D). Particularly the further information recorded during said later phase is also recorded interleaved into said section D and F.

What is claimed is:

1. A method of writing information in a record carrier body having a writing area provided with successively arranged sectors, each of said sectors comprising a heading field, a first and a second plurality of user segment locations, said second plurality being significantly fewer in number than said first plurality, said method comprising:
  (1) in a first phase, providing a replicated ready to use record carrier body of standard surface disposition, which record carrier body comprises standard information stored in said heading field;
  (2) in a second phase:
    (a) loading into a first random-access memory location, first user information to be written into said first plurality of user segment locations of one sector;
    (b) adding appropriate error correction bits to the first user information loaded into said first random access memory location;
    (c) writing in an interleaved manner in a bit serial sequence into said first plurality of user segment locations of one sector, both the first user information and the added error correction bits loaded into said first random-access memory location;
  (3) in a third phase, separated in time from said second phase, which time is substantially longer than the time required to write into a sector of said record carrier body:
    (a) loading into a second random-access memory location second user information to be written into said second plurality of user segment locations, said second user information updating said first user information;
    (b) adding appropriate error correction bits to the second user information loaded into said second random access memory location;
    (c) writing in an interleaved manner in a bit serial sequence into said second plurality of user segment locations of the same sector wherein said first user information was written during said second phase, both the second user information and the added error correction bits loaded into said second random-access memory location.

2. A device for writing information in a record carrier body having a writing area provided with successively arranged sectors, each of said sectors comprising a heading field with standard information stored therein, a first and a second plurality of user segment locations, said second plurality being significantly fewer in number than said first plurality, said device comprising:
   (1a) means to load into a first random-access memory location, first user information to be written into said first plurality of user segment locations of one sector;
   (b) means to add appropriate error correction bits to the first user information loaded into said first random access memory location;
   (c) means to write in an interleaved manner in a bit serial sequence into said first plurality of user segment locations of one sector, both the first user information and the added error correction bits loaded into said first random-access memory
   (2a) means to load into a second random-access memory location second user information to be written into said second plurality of user segment locations, said second user information updating said first user information;
   (b) means to add appropriate error correction bits to the second user information loaded into said second random access memory location;
   (c) means to write in an interleaved manner in a bit serial sequence into said second plurality of user segment locations of the same sector wherein said first user information was written during said second phase, both the second user information and the added error correction bits loaded into said second random-access memory location.

* * * * *